UNITED STATES PATENT OFFICE.

ANNA B. DORMAN, OF CAPE GIRARDEAU, MISSOURI.

IMPROVEMENT IN MEDICAL COMPOUNDS FOR DIARRHEA, &c.

Specification forming part of Letters Patent No. 133,213, dated November 19, 1872.

*To all whom it may concern:*

Be it known that I, Mrs. A. B. DORMAN, of Cape Girardeau, in the county of Girardeau and State of Missouri, have invented a Medicine for the Treatment of Diarrhea or Laxity of the Bowels, of which the following is a specification:

The invention consists in a compound formed of white-oak bark, cinnamon, cloves, dandelion-root, and brandy.

The proportions are as follows to every gallon of boiled water: Dandelion-root, three-fourths pound; cloves, three-fourths pound; white-oak bark, two and one-half pounds; cinnamon-bark, one-fourth pound; brandy, one-third gallon; boiled water, one gallon. I first boil down the water to one-third its original quantity—say, three gallons to one—and then thoroughly intermix the above ingredients. I then boil down these until about one gallon is the resultant.

By practical experiment I have found the most obstinate cases of diarrhea to yield in a short time to treatment with this compound.

Having thus described my invention, what I claim as new, and desire to secure by Letters Patent, is—

A compound formed of dandelion-root, cloves, white-oak bark, cinnamon-bark, and brandy, mingled in about the proportions specified.

MRS. ANNA B. DORMAN.

Witnesses:
LOUIS F. KLOSTERMANN,
AUGUST W. OSTERLOH.